Figure 1:
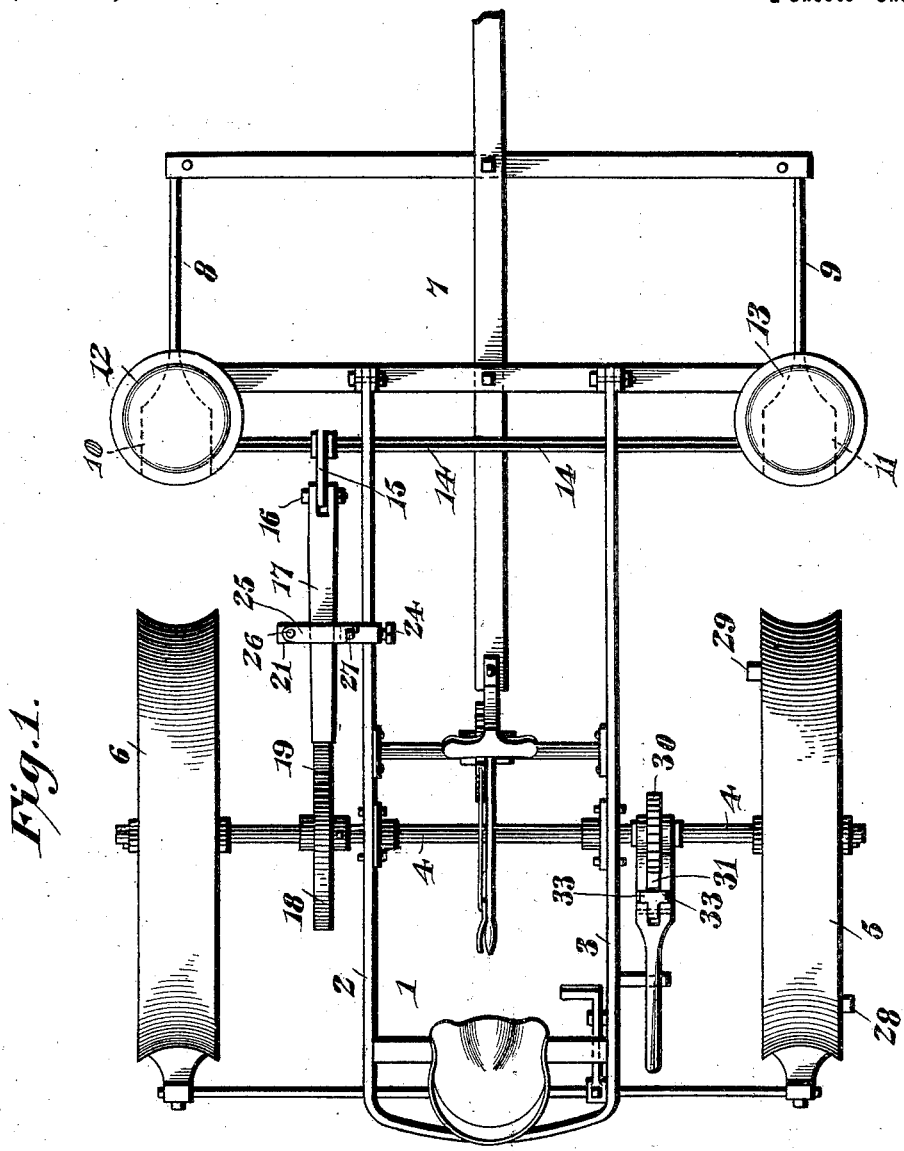

No. 691,195. Patented Jan. 14, 1902.
D. & O. SOMERS & C. POWERS.
CORN PLANTER.
(Application filed Aug. 21, 1901.)
(No Model.) 2 Sheets—Sheet 1.

Witnesses
Jas. K. McCathran
Lewis E. Julian

David Somers
Oral Somers   Inventors
Curtis Powers,
By
C. G. Siggers
Attorney

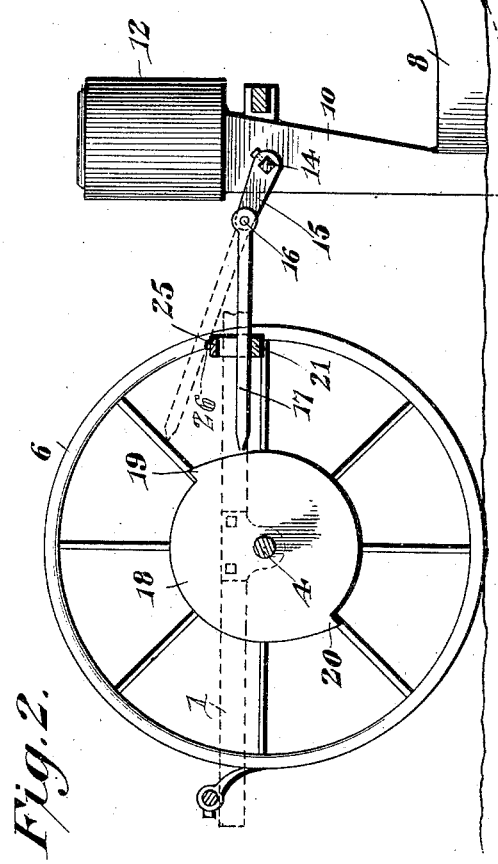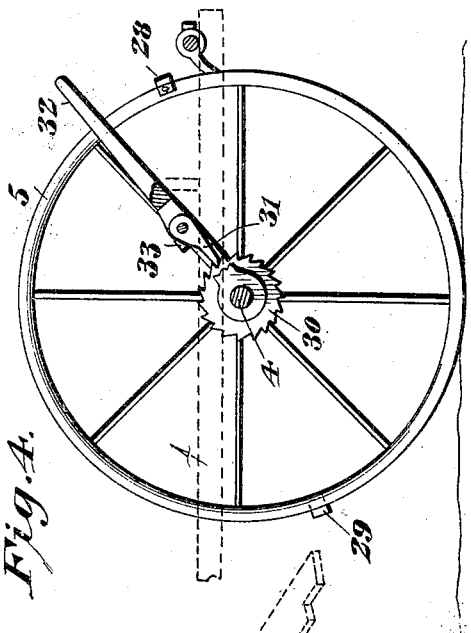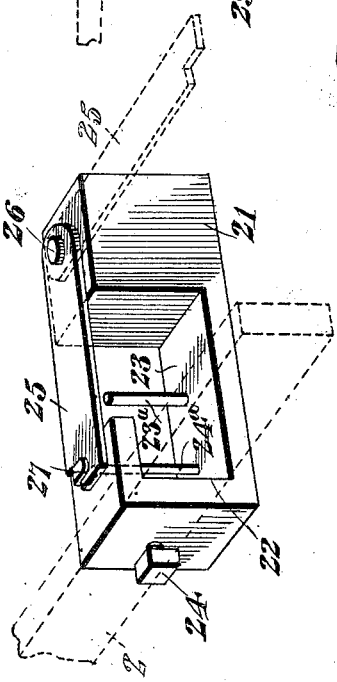

ance of
UNITED STATES PATENT OFFICE.

DAVID SOMERS, ORAL SOMERS, AND CURTIS POWERS, OF OSSIAN, INDIANA.

CORN-PLANTER.

SPECIFICATION forming part of Letters Patent No. 691,195, dated January 14, 1902.

Application filed August 21, 1901. Serial No. 72,842. (No model.)

*To all whom it may concern:*

Be it known that we, DAVID SOMERS, ORAL SOMERS, and CURTIS POWERS, citizens of the United States, residing at Ossian, in the county of Wells and State of Indiana, have invented a new and useful Corn-Planter, of which the following is a specification.

This invention relates to improvements in corn-planters of the type designated "wireless" check-row planters, and has for its object to provide an agricultural implement of this character with simple, durable, and efficient mechanism for dropping the corn at predetermined intervals, so that the hills will be properly spaced apart with regularity and precision.

A further object of the invention is to provide simple means for throwing the dropping mechanism into and out of operation, so that the dropping of the corn will be effected automatically as the planter is drawn across the field or will be prevented from dropping during the transportation of the implement from one point of use to another.

Other objects of the invention subordinate to those enumerated will hereinafter more fully appear as the necessity for their accomplishment is developed in the succeeding description of that preferred form of our invention which is illustrated in the accompanying drawings and embraced within the scope of the appended claims.

In said drawings, Figure 1 is a plan view of a corn-planter equipped with our invention. Fig. 2 is a longitudinal sectional elevation illustrating the construction and operation of the dropping mechanism and showing the tappet-arm in dotted lines in its inoperative position. Fig. 3 is a detail perspective view of the bearing-bracket, showing in dotted lines the open position of the gate; and Fig. 4 is a sectional elevation of the marker-wheel-adjusting lever, the ratchet-wheel, and the marker-wheel.

Like numerals of reference are employed to designate corresponding parts throughout the views.

The organization of the corn-planter as a whole, aside from the dropping mechanism and the check-wheel-adjusting device, is ordinary and comprises the planter or wheel frame 1, comprising connected side bars 2 and 3, supported upon a shaft or axle 4, passed through and journaled in the side bars and having fixed to its outer ends the carrying-wheels 5 and 6, located beyond the opposite sides of the frame, as shown. In advance of the planter-frame is located the runner-frame 7, the detailed construction of which need not be described, as it constitutes no part of the present invention. It may be stated, however, that this frame is adjustably connected with the main or wheel frame 1 in the usual manner and comprises runners 8 and 9 and dropper-tubes 10 and 11 and supports seed-boxes or hoppers 12 and 13 above the dropper-tubes and in position to deposit corn or other seeds into the ground through the tubes.

The feed mechanism with which each of the hoppers is provided is also ordinary and need not be described; but, as shown in the drawings, these feed mechanisms are operated by a rock-shaft 14, extending transversely across the runner-frame at its rear end and ordinarily designated the "operating-shaft," since by the rocking thereof the feed mechanisms of the hoppers are operated to effect the dropping of the corn simultaneously from each of the hoppers or seedboxes at predetermined intervals as the planter advances over the ground.

We now come to a consideration of the mechanism comprehended by our invention, which mechanism, as heretofore premised, is designed to effect the dropping of the seed at predetermined regular intervals by causing the rocking of the operating-shaft 14 to open the feed-valves. This mechanism comprises a rocker-arm 15, extending rearwardly from the rock-shaft 14, adjacent to one end thereof, and having pivotal connection at its outer end, as indicated at 16, with the front end of the tappet-arm 17, normally disposed in a horizontal plane, and extended rearwardly into operative proximity to a cam-wheel 18, keyed or otherwise secured upon the shaft or axle 4 at any suitable point, but preferably between the frame and one of the carrying-wheels. The cam-wheel 18 may be given any desired form accordingly as a greater or less interval is desired between the hills. In the illustrated embodiment of the invention, however, it is designed to cause the corn to be dropped twice during each complete rotation of the carrying-wheels, and the cam-wheel 18 is therefore shown as being provided with two cam projections 19 and 20, disposed at diametrically opposite points and arranged to engage the adjacent end of the tappet-arm 17 for the purpose of reciprocating the latter twice during each rotation of the carrying-wheels, the retraction of the tappet-arm 17 after each actuation by the cams being effected by the retracting means associated with and constituting a part of a feed mechanism, as is well understood in the art. It is obvious that such reciprocation of the tappet-arm will effect the oscillation of the arm 15 and the consequent opening of the feed-valves through the rocking of the operating-shaft.

Supported in any suitable manner, but preferably by attachment to one of the side bars of the frame 1, is a bearing-bracket 21, formed with a laterally-opening socket 22 for the reception of the frame-bar, to which it is attached, and with an upwardly-opening bearing 23 for the slidable support of the tappet-arm, the bracket being provided with a binding-screw or other suitable retaining device 24, designed to bear against the bar to hold the bracket securely in place. The socket 22 for the frame-bar opens into the seat 23 and is closed by a gate-pin 24$^a$, passed vertically through the top and bottom walls of the bracket to retain the end wall of the bracket against the outer face of the frame-bar. Upstanding from the bottom of the seat 23 is preferably provided, as shown, a spacing-pin 23$^a$, designed to prevent undue sidewise movement of the tappet-arm. The bearing-seat 23 for the tappet is closed by a pivoted gate 25, extended across the top of the seat 23 and pivoted to the bracket at its outer end, as indicated at 26, whereby said gate may be swung to a closed position to prevent the lateral withdrawal of the tappet-arm by the upward swinging of the latter or may be swung to its open position, as indicated in dotted lines in Fig. 3, to permit the elevation of the tappet-arm out of operative relation with the cam-wheel. When in its closed position, the gate is retained by a latch 27, engaging its free end and preferably formed at the upper end of the gate-pin 24$^a$, as shown.

In check-row planters of the character with which our invention is concerned it is usual to employ some form of checking or marking device by means of which the ground is marked or checked at those points at which the seeds are deposited in order that in retraversing the field the operator may be guided in planting the hills of corn in direct line with the hills of the rows previously planted. In the present construction the checks or marking-blocks 28 and 29 are screwed or otherwise secured upon the periphery of one of the driving-wheels, preferably the wheel 5, located at the right-hand side of the planter. These checks or check-blocks are located upon the wheel at such points as will present them directly over the seeds dropped from the seedboxes, so that the seeds having been dropped the further advance of the machine will cause the blocks to properly check the ground to indicate the location of the hills. Inasmuch, therefore, as the check-wheel and the cam-wheel are rotated in unison the seeds will be properly dropped and checked at regular intervals. The number of check-blocks will, of course, depend upon the number of projections upon the cam-wheel, since it is evident that as each projection effects the dropping of the seeds a like number of projections and check-blocks must be employed in order to properly drop the seeds and check the hills.

Another important feature of the invention resides in the provision of means for resetting or adjusting the marking and cam wheels when the end of a row has been reached. As soon as the last hill in a row has been planted the machine is turned, and it sometimes happens, therefore, that when the machine is in position to be drawn back over the field for the planting of another row the mechanism will not be in proper position to deposit the first hill of the row to be planted at a point directly opposite the last hill in the planted row. We therefore provide the axle or shaft 4, preferably adjacent to the check-wheel 5, with a ratchet-wheel 30, the teeth of which are designed to be engaged with the pawl 31 of what may be termed a "check-wheel-adjusting lever" 32, having a bifurcated end spanning the ratchet-wheel, as shown, and having a bearing upon the axle, the pawl 31 being pivotally mounted between the bifurcations of the lever and provided with lateral stops 33 for limiting its movement in one direction. By means of this lever, which, like the tappet-arm 17, is in convenient reach of the driver, the shaft and wheels may be rotated while the machine is not in motion in order that the parts may be placed in position to drop the corn immediately upon the starting of the machine.

Briefly, the operation of the planter equipped with our invention is as follows: The machine is drawn across the field by the draft-animals in the usual manner, and as the cam-wheel rotates with the carrying-wheels 5 and 6 the projections 19 and 20 on said cam-wheel will be successively presented to the rear end of the tappet-arm 17, causing the latter to be moved endwise and the operating-shaft 14 to be rocked to operate the feed mechanism to drop the corn as the machine advances, after which dropping of the corn or seeds the hills will be marked by the check-blocks. When the machine has reached the end of the row and is turned, the driver by manipulating the check-wheel-adjusting lever is enabled to present the cam and check wheels in proper position to properly drop the corn and to check the hills in the next row at points directly opposite the hills of the row which has just been planted. When the planting of the field has been completed, the gate 25 of the tappet-arm bearing is swung to its open position and the tappet-arm is swung upwardly out of engagement with the cam-wheel. The gate 25 is then closed and the tappet-arm will rest thereon in an inoperative position, so that the machine may be transported from one point of use to another without effecting the operation of the dropping mechanism.

It is thought that from the foregoing the construction and operation of our invention will be clearly apparent; but while the present embodiment of the invention is believed at this time to be preferable we desire to reserve to ourselves the right to effect such changes, modifications, and variations thereof as may be properly embraced within the scope of the protection prayed.

What we claim is—

1. In a corn-planter, the combination with a frame, seedboxes, dropper-tubes, and dropper mechanism, of a pivoted tappet-arm operatively related to the dropper mechanism, a cam operated by the forward movement of the planter to actuate the tappet-arm, an upwardly-opening bearing-bracket secured to the frame at a point intermediate of the ends of the tappet-arm, a movable gate mounted upon the bearing-bracket to confine the tappet-arm therein for actuation by the cam, and to support said arm in an inoperative position, and means for retaining the gate in its closed position.

2. In a corn-planter, the combination with a frame, an axle, carrying-wheels and a cam-wheel fixed on the axle, of seedboxes, dropper-tubes and feed mechanism within said seedboxes, an operating-shaft connected with the feed mechanism and provided with a laterally-disposed rocker-arm, a tappet-arm connected to the rocker-arm and opposed to the cam-wheel, an upwardly-opening bearing-bracket secured to the frame at a point intermediate of the ends of the tappet-arm, a movable gate mounted upon the bearing-bracket to confine the tappet-arm therein for actuation by the cam, and to support said tappet-arm in an inoperative position, and means for retaining the gate in its closed position.

3. In a corn-planter, the combination with a frame, seedboxes and dropper-tubes carried thereby, dropper mechanism, a pivoted tappet-arm operatively related to the dropper mechanism, and a cam operated by the forward movement of the planter and in operative relation with the tappet-arm, of a bearing-bracket provided with a laterally-opening socket for the reception of a frame-bar, and with an upwardly-opening bearing for the reception of the tappet-arm, means for securing the bracket to the frame-bar, and a pivoted gate mounted on the bracket and extended across the open side of the upwardly-opening bearing, whereby said gate may confine the tappet-arm in its operative position or sustain said arm in its inoperative position, as desired.

4. In a corn-planter, the combination with a frame, seedboxes and dropper-tubes carried thereby, dropper mechanism, a pivoted tappet-arm operatively related to the dropper mechanism, and a cam operated by the forward movement of the planter and in operative relation with the tappet-arm, of a bearing-bracket formed with a laterally-opening socket for the reception of a frame-bar and with an upwardly-opening bearing for the slidable support of the tappet-arm, a retaining device for securing the bracket to the frame-bar, a spacing-pin located within the bearing and designed to prevent undue sidewise movement of the tappet-arm, a pivoted gate carried by the bracket and closing the upwardly-opening bearing, and means for retaining the gate in its closed position.

In testimony that we claim the foregoing as our own we have hereto affixed our signatures in the presence of two witnesses.

DAVID SOMERS.
ORAL SOMERS.
CURTIS POWERS.

Witnesses:
W. A. WOODWARD,
A. G. GORRELL.